United States Patent [19]
Check et al.

[11] Patent Number: 6,105,126
[45] Date of Patent: *Aug. 15, 2000

[54] ADDRESS BIT DECODING FOR SAME ADDER CIRCUITRY FOR RXE INSTRUCTION FORMAT WITH SAME XBD LOCATION AS RX FORMAT AND DISJOINTED EXTENDED OPERATION CODE

[75] Inventors: Mark Anthony Check, Hopewell Junction; Ronald M. Smith, Sr., Wappingers Falls; John Stephen Liptay, Rhinebeck; Eric Mark Schwarz, Gardiner; Timothy John Slegel, Staatsburg; Charles Franklin Webb, Poughkeepsie, all of N.Y.

[73] Assignee: International Business Machines Corporation, Armonk, N.Y.

[*] Notice: This patent is subject to a terminal disclaimer.

[21] Appl. No.: 09/070,359

[22] Filed: Apr. 30, 1998

[51] Int. Cl.[7] .................................................. G06F 9/34
[52] U.S. Cl. .......................... 712/210; 711/214; 711/220
[58] Field of Search ................................... 711/214, 220; 712/210, 213

[56] References Cited

U.S. PATENT DOCUMENTS

| | | | |
|---|---|---|---|
| 4,616,313 | 10/1986 | Aoyagi ..................................... | 712/212 |
| 5,345,567 | 9/1994 | Hayden et al. .......................... | 712/228 |
| 5,535,347 | 7/1996 | Growchowski et al. ................ | 712/204 |
| 5,694,617 | 12/1997 | Webb et al. .............................. | 710/40 |

OTHER PUBLICATIONS

"Resolving Store Load Links in a Instruction Unit" by Bullions et al., IBM Technical Disclosure Bulletin, vol. 14, No. 3, Aug. 1971, p. 868.

"In Line Code Packing Method" by Crews, IBM Technical Disclosure Bulletin, vol. 14, No. 4, Sep. 1971, pp. 1334–1336.

"Self–Aligning Multidecode Mechanism" by Emma et al., IBM Technical Disclosure Bulletin, vol. 38, No. 2, Feb. 1995, p. 181.

"Enhanced Overlap in Multiple E–Unit Processors" IBM Technical Disclosure Bulletin, N309, Jan. 1990.

"Technique for Bit Array Manipulation" by Page, IBM Technical Disclosure Bulletin, vol. 16, No. 6, Nov. 1973, pp. 2021–2025.

*Primary Examiner*—Kenneth S. Kim
*Attorney, Agent, or Firm*—Lynn L. Augspurger

[57] ABSTRACT

A computer processor floating point processor six cycle pipeline system where instruction text is fetched prior to the first cycle and decoded during the first cycle for the fetched particular instruction and the base (B) and index (X) register values are read for use in address generation. RXE Instructions are of the RX-type but extended by placing the extension of the operation code beyond the first four bytes of the instruction format and to assign the operation codes in such a way that the machine may determine the exact format from the first 8 bits of the operation code alone. ESA/390 instructions SS, RR; RX; S; RRE; RI; and the new RXE instructions have a format which can be used for fixed point processing as well as floating point processing where instructions of the RXE format have their R1, X2, B2, and D2 fields in the identical positions in said instruction register as in the RX format to enable the processor to determine from the first 8 bits of the operation code alone that an instruction being decoded is an RXE format instruction and the register indexed extensions of the RXE format instruction, after which it gates the correct information to said X-B-D adder. During the second cycle the address add of B+X+Displacement is performed and sent to the cache processor's, and during the third and fourth cycles the cache is respectively accessed and data is returned, and during a fifth cycle execution of the fetched instruction occurs with the result putaway in a sixth cycle.

3 Claims, 4 Drawing Sheets

| FORMAT | FIRST HALFWORD | SECOND HALFWORD | THIRD HALFWORD |
|---|---|---|---|

RR: | OP CODE | R₁ | R₂ |
bits: 0, 8, 12, 15

RX: | OP CODE | R₁ | X₂ | B₂ | D₂ |
bits: 0, 8, 12, 16, 20, 31

S: | OP CODE | B₂ | D₂ |
bits: 0, 16, 20, 31

RRE: | OP CODE | //// //// | R₁ | R₂ |
bits: 0, 16, 24, 28, 31

RI: | OP CODE | R₁ | OPCD | I₂ |
bits: 0, 8, 12, 16, 31

RXE: | OP CODE | R₁ | X₂ | B₂ | D₂ | //// //// | OP CODE |
bits: 0, 8, 12, 16, 20, 32, 40, 47

RXEalt: | OP CODE | //// //// | R₁ | X₂ | B₂ | D₂ |
bits: 0, 16, 24, 28, 32, 40, 47

FIG.1

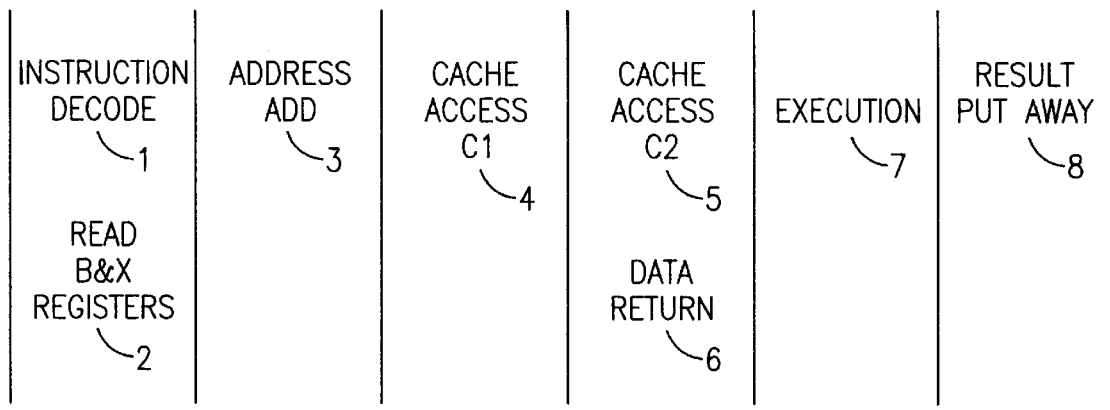

FIG.2A

| STAGE | TIME → | | | | | | | | |
|---|---|---|---|---|---|---|---|---|---|
| | $T_1$ | $T_2$ | $T_3$ | $T_4$ | $T_5$ | $T_6$ | $T_7$ | $T_8$ | $T_9$ |
| IF | $IF_1$ | $IF_2$ | $IF_3$ | $IF_4$ | $IF_5$ | $IF_6$ | $IF_7$ | $IF_8$ | $IF_9$ |
| DEC | | $DEC_1$ | $DEC_2$ | $DEC_3$ | $DEC_4$ | $DEC_5$ | $DEC_6$ | $DEC_7$ | $DEC_8$ |
| AGEN | | | $AGEN_1$ | $AGEN_2$ | $AGEN_3$ | $AGEN_4$ | $AGEN_5$ | $AGEN_6$ | $AGEN_7$ |
| CA | | | | $CA_1$ | $CA_2$ | $CA_3$ | $CA_4$ | $CA_5$ | $CA_6$ |
| CR | | | | | $CR_1$ | $CR_2$ | $CR_3$ | $CR_4$ | $CR_5$ |
| EX | | | | | | $EX_1$ | $EX_2$ | $EX_3$ | $EX_4$ |
| WR | | | | | | | $WR_1$ | $WR_2$ | $WR_3$ |

INSTRUCTION EXECUTION PIPELINE TIMING

| IF | INSTRUCTION FETCH |
|---|---|
| DEC | INSTRUCTION DECODE, AND READ X2 AND B2 FROM GPRs |
| AGEN | OPERAND ADDRESS GENERATION (ADD X2, B2, D2) |
| CA | CACHE ACCESS |
| CR | CACHE DATA RETURN, AND READ R1 FROM FPRs |
| EX | EXECUTION |
| WR | WRITE |

FIG.2B

ADDRESS BIT DECODING FOR SAME ADDER CIRCUITRY FOR RXE INSTRUCTION FORMAT WITH SAME XBD LOCATION AS RX FORMAT AND DIS-JOINTED EXTENDED OPERATION CODE

CROSS REFERENCE TO RELATED APPLICATIONS

The present application related to the following co-pending patent application filed concurrently herewith:

"RXE Instructions for Floating Point Processors", U.S. Ser. No. 09/070,198, filed Apr. 30, 1998.

This co-pending application and the present application are owned by one and the same assignee, International Business Machines Corporation of Armonk, N.Y.

FIELD OF THE INVENTION

This invention is related to computers and computer systems in particular to a processor that has instruction formats that contain register numbers to obtain values for address generation.

BACKGROUND OF THE INVENTION

The System/390 architecture is an evolution of the System/360, which was announced in April 1964. During this 34 year evolutionary process, many new functions and instruction formats have been added; at the same time, compatibility has been maintained for most programs written for the original System/360. Many of the extensions are for complex functions in which an additional cycle or two during the instruction decode is not a significant performance problem.

There are however, certain cases in which a performance difference of one or two cycles can be very significant. In particular, the support for a new floating-point format requires more than 20 new instructions in the RX (register indexed from storage) format. There are not that many spare 1-byte operation codes in the RX format. Thus, we deem it necessary to provide an extended operation code for these new instructions. All previous extensions to add new instructions to the System/360 instruction set have been by means of an extended operation code of either four bits or eight bits in the next sequential byte of the instruction.

We note that for floating point the RS/6000 has a non-contiguous operation code within the 32-bit instruction format. The ESA/390 RI format also has a non-contiguous operation code, but within the first 16-bits of the instruction. How an extended operation code for new RX instructions can be done that provides support for high frequency operation needed a solution.

SUMMARY OF THE INVENTION

Our preferred embodiment for the RX-type new format places the extension of the operation code beyond the first four bytes of the instruction format and to assign the operation codes in such a way that the machine may determine from the first 8 bits of the operation code alone, the exact format of the instruction. This RXE instruction format can be used for both fixed point processing as well as floating point processing.

With this solution, new machines can run programs which are written to use our new format version for the architecture which we will describe.

These and other improvements are set forth in the following detailed description. For a better understanding of the invention with advantages and features, refer to the description and to the drawings.

BRIEF DESCRIPTION OF THE DRAWINGS

FIG. 1 illustrates the instruction format of the preferred embodiment for: RR; RX; S; RRE; RI; RXE; and RXEalt instructions.

FIG. 2 illustrates the pipeline sequence used in the ESA/390 G4 (Generation 4) and G5 (Generation 5) series processors, with the timing of the instruction execution pipeline shown in two parts as FIGS. 2A and 2B, with FIG. 2A illustrating the pipeline sequence for a single instruction, and FIG. 2B illustrating the pipeline sequences for a stream of instructions used in the ESA/390.

Figure 3:
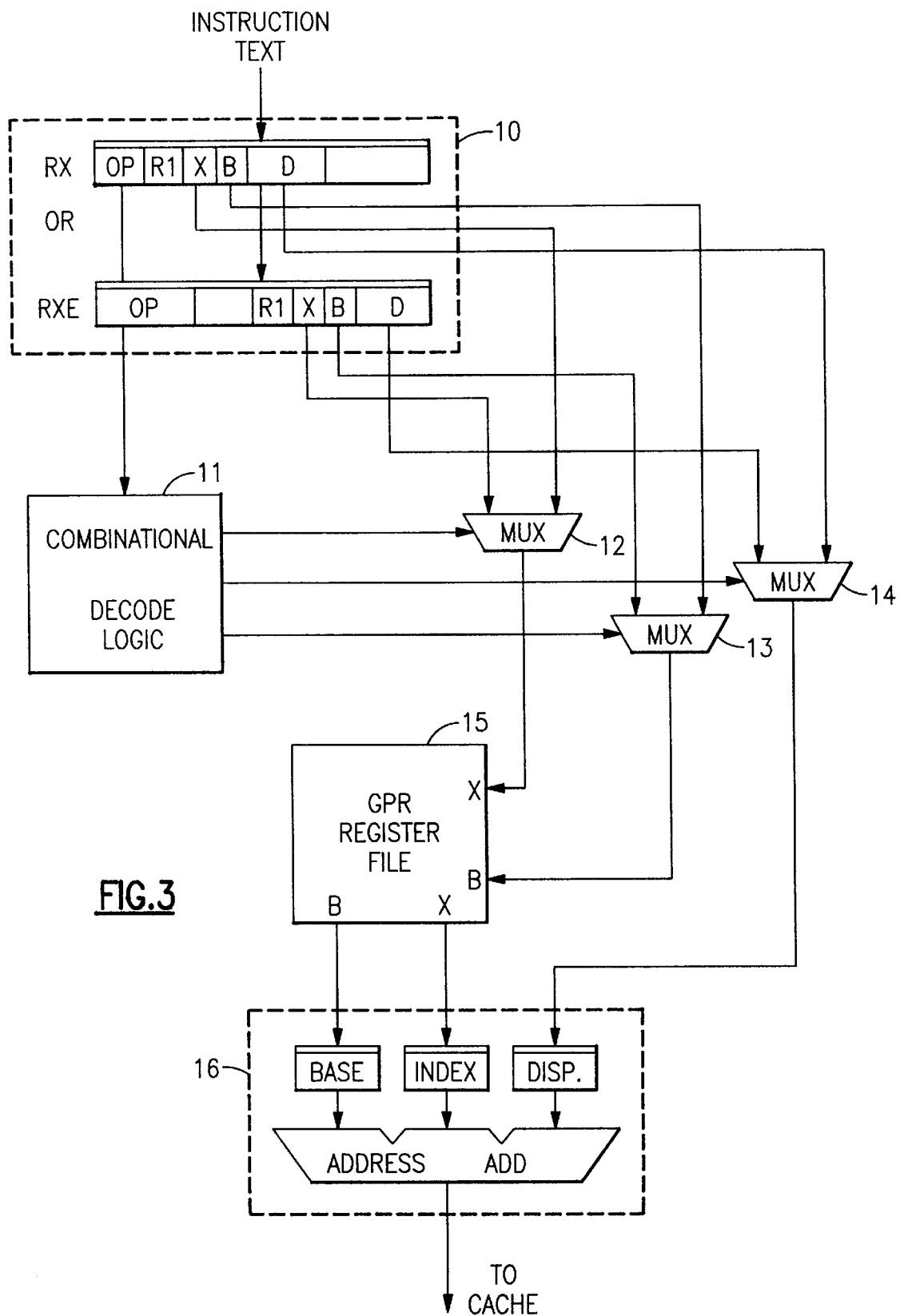
FIG. 3 illustrates the basic schematic flow with the RXEalt format in order to demonstrate its limitations.

(Note: For convenience of illustration, FIGURES may be separated in parts and as a convention we place the top of the FIGURE as the first sheet, with subsequent sheets proceeding down and across when viewing the FIGURE, in the event that multiple sheets are used.)

DETAILED DESCRIPTION OF THE INVENTION

Before considering our preferred embodiments in detail, it may be worthwhile to illustrate some considerations we had to face. While other architectures have used prefix or suffix formats within the fixed portion of the instruction text, the X-B-D format of the System/360 creates some unique problems. It was not always recognized that the X-B-D address generation will of necessity be a critical path and therefore needs to have special attention in the instruction layout. Note also that the variable-length instruction format of the System/360 (where instructions may be 2, 4, or 6 bytes in length) creates additional complexity in the hardware and makes the solution to extensions and optimum performance a more difficult problem.

Furthermore, an RXE format can be compared with alternative formats; for example the RXEalt format, as will be shown. At first appearance, these two formats appear to be equivalent. But when the circuitry required to implement the two is examined in detail, it turns out that there are fewer stages in the critical path for the RXE format than for the alternative.

Furthermore, for reasons of performance, most S/390 hardware implementations provide a separate adder used exclusively to perform the X-B-D address generation. This adder, and the associated gating circuitry, are in the critical path in determining the cycle time of the processor. If a new instruction format is introduced which places the X, B, and D fields at different offsets in the instruction format, this would require additional gating, increasing the number of circuit levels in this path. Thus, a new format for RX-type instructions must allow operation and not require either additional cycles for the X-B-D address computation or an increase in the cycle time of the entire CPU.

Our preferred embodiment for the RX-type new format places the extension of the operation code beyond the first four bytes of the instruction format and to assign the operation codes in such a way that the machine may determine from the first 8 bits of the operation code alone, the exact format of the instruction, as discussed below.

FIG. 1 shows various instruction formats. The RR and RX formats were part of the original System/360, and have 8-bit operation codes. The S format, which was one of the first extensions, uses a 16-bit operation code, followed by a B2 and D2 field in the same bit positions as the B2 and D2 fields of the original RX format. The RRE format, which was also an early extension, uses a 16-bit operation code, followed by R1 and R2 fields, which are not in the same positions as the R1 and R2 fields of the RR format. The placement of the R fields for this format is not a problem, as the path to access these registers is not a particularly critical path.

The RI format, a more recent extension, shows a 12-bit operation code, where the 4-bit extension is in the second byte of the instruction, but not contiguous to the first 8 bits of the operation code.

The RXE format, the subject of this invention, places the R1, X2, B2, and D2 fields in the identical positions as in the RX format. Assignment of operation codes is very critical to the implementation for the RXE format. The machine must be able to determine from the first 8 bits of the operation code alone that this is indeed an RXE format instruction, and using this information, gate the correct information to the X-B-D address adder.

FIG. 1 illustrates our preferred embodiment for the new RXE format, as well as the other formats there shown for comparison. In FIG. 2 the pipeline is shown with FIG. 2A illustrating the pipeline sequence for a single instruction. Prior to the first cycle in the pipeline the instruction text is fetched. During the first cycle for a particular instruction it is decoded (1) and the base (B) and index (X) registers are read (2) for use in address generation. During the second cycle the address add (3) of B+X+Displacement (D) is performed and sent to the cache. During the third and fourth cycles the cache is accessed (4)(5) and data is returned (6). At cycle 5 execution (7) occurs with result putaway (8) in cycle six. Thus the critical path for the B & X fields are the first cycle in which instruction decode and register array read is accomplished. The instruction execution pipeline timing is shown at the bottom of FIG. 2, where it will be noted from FIG. 2B illustrating the pipeline sequences for a stream of instructions used in the ESA/390 that the AGEN logic adds the contents of X2 and B2 to the displacement and this is done in the cycle immediately after decode. This shows why the register specification for address generation is more critical than data read for execution.

In FIG. 3 the instruction text is loaded into the instruction register (10) to perform the instruction decode logic. Since the Base and Index fields could be in multiple locations with the RXEalt format some combinatorial logic (11) must determine where the B and X fields are in the instruction. This is then used to control muxes for Index (12), Base (13), and Displacement (14). The output values from the muxes for Base and Index are then used to access the GPR register file (15), which for ESA/390 is 16 entries. The output of the GPR register file, and the displacement information is placed in latches for use by the address adder (16) the next cycle. As can be seen from this schematic the path is from the opcode part of the instruction text (10) through some combinatorial logic (11) to the base (13) and index (12) muxes to the GPR file (15) to the registers (16). This path is cycle time prohibitive.

Figure 4:
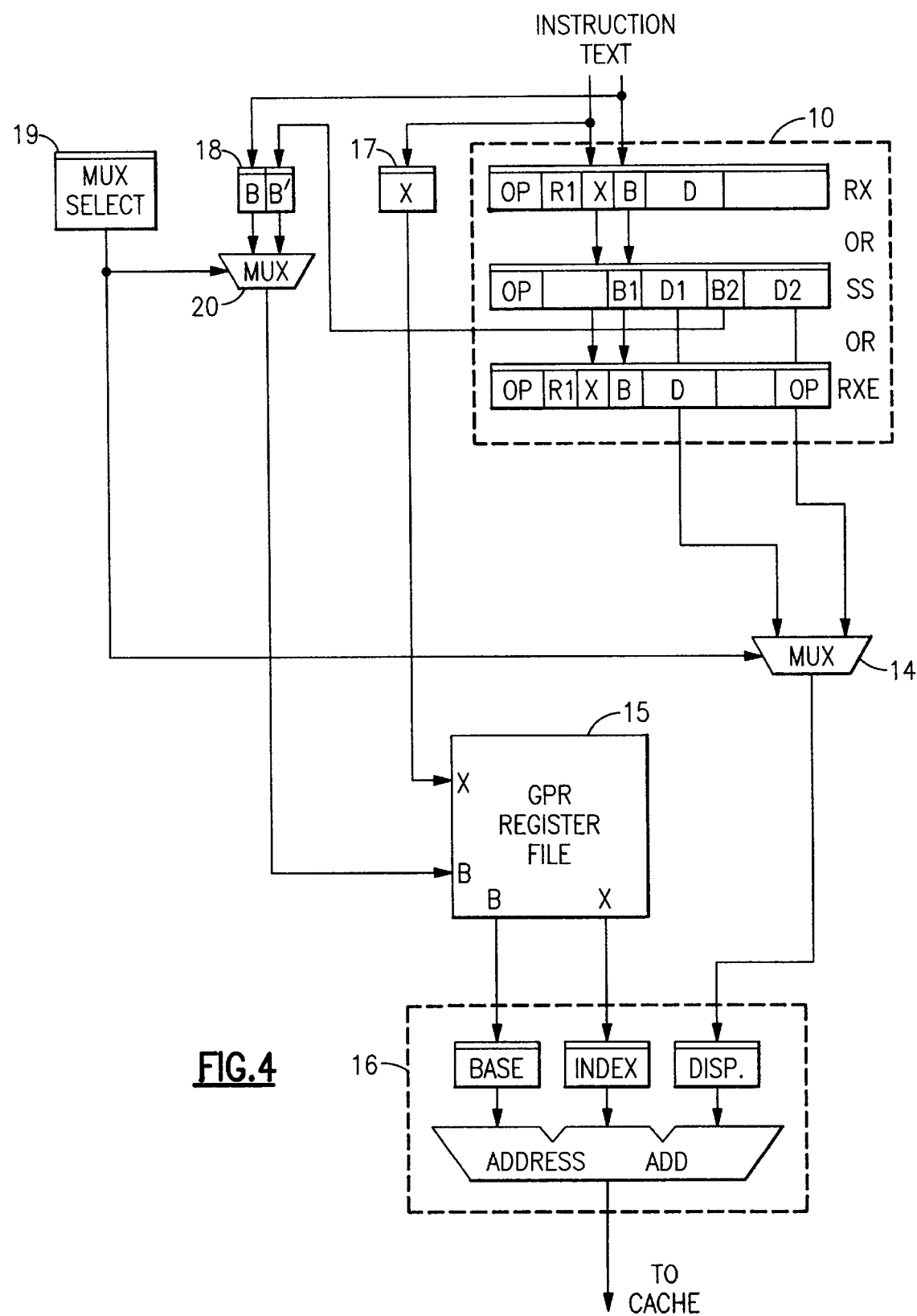
FIG. 4 illustrates the basic schematic flow with the preferred RXE format embodiment to show its solution of the problem.

In FIG. 4 the instruction text is loaded into the instruction register (10) to perform the instruction decode logic. At the same time the data from the initial positions of B & X in the instruction format is also loaded into registers for index (17) and base (18). Also when a new instruction is loaded into the instruction register (10) the register mux select (19) is set to a zero. Now the index register (17) goes directly to the GPR register file (15). For the base register (18) the mux control (19) controls the base mux (20) directly to chose the default base location to send to the GPR register file (15). It also controls the displacement mux (14). The base and index register values with the displacement value are latched for use by the address adder (16). In the case of ESA/390 SS format instructions the second base register is gated from the instruction text during the first cycle to the B prime slot in the base register (18) and the mux select control (19) is set to a one. Thus the critical path is now the base register values(18) to a mux (20) that is controlled by a register output (19) to the GPR file (15) to the registers for the address adder (16). Thus eliminating the combinatorial function (11) from the critical path. This is only possible because the preferred embodiment has the B and X fields in the same positions for the RXE format as the RX format. This path allows the achievement of the cycle time goals for the processor.

While we have described our preferred embodiments of our invention, it will be understood that those skilled in the art, both now and in the future, may make various improvements and enhancements which fall within the scope of the claims which follow. For instance, it will be recognized that this can be for fixed point processing as well as floating point processing. These claims should be construed to maintain the proper protection for the invention first disclosed.

What is claimed is:

1. A computer processor system for executing instructions having an operation code for an instruction having more than four bytes comprising a processor with a cache and having a separate adder for performing X-B-D addressing, including base, extended and displacement B-X-D addressing, and associated gating circuitry for general purpose register (GPR) access in a critical path determining a cycle time of the processor system and also having instruction registers for instructions of specific formats, said separate adder being enabled for executing register indexed from storage instructions in an RX (register indexed from storage) format having an operation code field of 8 bits as said RX format's initial field and having an R1, X2, B2 and D2 fields in said instruction format following said operation code field for a first Operand Register (R1) field, a second Operand Index Register (X2) field, a second Operand Base Register (B2) field, and a second Operand Displacement Amount (D2) field respectively, and wherein said instruction register is enabled to decode an instruction with processor decode logic after loading an instruction text into the instruction register for performing instruction decode logic, and wherein said separate adder is also enabled for processing register indexed extended instructions in an RXE format after said register indexed extended instructions have been loaded for an instruction text into the instruction register to perform instruction decode logic in which said register indexed extended instruction in an RXE format has an operation code field as said RXE format's initial field of 8 bits and has R1, X2, B2 and D2 fields following said operation code field and register indexed extensions of the operation code placed after the R1, X2, B2 and D2 fields where instructions of the RXE format have their R1, X2, B2, and D2 fields in the identical positions in said instruction register as in the RX format to enable the processor decode logic to determine from an initial 8 bits of the operation code alone that an instruction being decoded is an RXE format instruction and wherein register indexed extensions of the operation code for said register indexed extended instructions are placed in an instruction beyond the first four bytes of the instruction format, whereby the operation codes are assigned for the processor in such a way that after the processor decode logic determines from the first 8 bits of the operation code alone the exact format of the instruction, and that an instruction being decoded is an RXE format instruction, the processor decode logic gates correct information to said separate adder, and in which instructions are processed in a pipeline, in which prior to a first cycle of the pipeline an instruction text is fetched, and during the first cycle for the fetched particular instruction it is decoded and the base (B) and index (X) register values are read for use in address generation; and during another pipeline cycle the address add of B+X+Displacement is performed and sent to the cache.

2. A computer processor system according to claim 1 in which before processing of an instruction the instruction text is loaded into the instruction register to perform the instruction decode logic, while at the same time data from the initial positions of B & X in the instruction format is loaded into registers for index and base, and when a new instruction is loaded into the instruction register a register mux select control is set to a zero such that said index register is coupled directly to a GPR (General Purpose Register) register file and a base register under the mux select control connects a base mux directly to chose the default base location to send to the GPR register file and also a displacement mux whereby the base resister, index register and the displacement mux values are latched for use by the address adder.

3. A computer processor system according to claim 1 in which said processor also processes instructions of an SS (Storage to Storage) format, and when the instruction text for instructions of the SS format are loaded into the instruction register a second base register is gated from the instruction text during the first cycle of the pipeline to a B prime slot in the base register and a mux select control is set to a one such that the critical path is the base register values to a mux that is controlled by a register output to a GPR (General Purpose Register) register file to the registers for the address adder eliminating any combinatorial function from the critical path.

\* \* \* \* \*